US012555413B2

(12) United States Patent
Lev et al.

(10) Patent No.: US 12,555,413 B2
(45) Date of Patent: Feb. 17, 2026

(54) DETECTION OF A CHANGE IN FACE GESTURE IN IMAGES

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 317 days.

(21) Appl. No.: 18/238,575

(22) Filed: Aug. 28, 2023

(65) Prior Publication Data

US 2025/0078571 A1   Mar. 6, 2025

(51) Int. Cl.
*G06V 40/16* (2022.01)
*G06V 10/762* (2022.01)

(52) U.S. Cl.
CPC .......... *G06V 40/176* (2022.01); *G06V 10/762* (2022.01); *G06V 40/168* (2022.01); *G06V 40/172* (2022.01)

(58) Field of Classification Search
CPC .. G06V 40/176; G06V 10/762; G06V 40/168; G06V 40/172; G06V 40/20
See application file for complete search history.

(56) References Cited

U.S. PATENT DOCUMENTS

| | | | |
|---|---|---|---|
| 2019/0138794 A1* | 5/2019 | Huang | G06F 21/32 |
| 2019/0332902 A1* | 10/2019 | Gallagher | G06V 10/811 |
| 2020/0393908 A1* | 12/2020 | Kejariwal | G06V 40/167 |
| 2022/0414366 A1* | 12/2022 | Zotto | G06T 11/00 |

* cited by examiner

*Primary Examiner* — Phuoc Tran

(57) ABSTRACT

There is provided a computer implemented method of analyzing a sequence of images for detection of a change in face gesture, comprising: analyzing the sequence of time spaced images depicting a face of a subject to compute a baseline representation denoting a baseline state of the subject, for a respective image of the sequence of time spaced images depicting a face of a subject: extracting a plurality of features from the face of the subject of the respective image, computing a respective representation from the plurality of features, comparing the respective representation to the baseline representation, and detecting a change in face gesture of the subject when the comparison is above a threshold.

18 Claims, 7 Drawing Sheets

DETECTION OF A CHANGE IN FACE GESTURE IN IMAGES

BACKGROUND

The present invention, in some embodiments thereof, relates to image processing and, more specifically, but not exclusively, to systems and methods for assessing face gestures by analyzing images.

Images may be analyzed to detect face gestures. For example, using computer vision and/or machine learning approaches to understand and/or interpret the emotions and/or sentiments expressed by individuals in images.

SUMMARY

According to a first aspect, computer implemented method of analyzing a sequence of images for detection of a change in face gesture, comprises: analyzing the sequence of time spaced images depicting a face of a subject to compute a baseline representation denoting a baseline state of the subject, for a respective image of the sequence of time spaced images depicting a face of a subject: extracting a plurality of features from the face of the subject of the respective image, computing a respective representation from the plurality of features, comparing the respective representation to the baseline representation, and detecting a change in face gesture of the subject when the comparison is above a threshold.

According to a second aspect, computer implemented method of analyzing a sequence of images for detection of a change in face gesture, comprises: analyzing the sequence of time spaced images depicting a face of a subject to identify a face gesture image indicating a change in face gesture of the subject, extracting a plurality of features from the face of the subject of the face gesture image, computing a face gesture representation from the plurality of features, for a respective image of the sequence of time spaced images: extracting the plurality of features from the face of the subject of the respective image, computing a respective representation from the plurality of features, comparing the respective representation to the face gesture representation, and detecting the change in face gesture when the comparison is below a threshold indicating similarity with the face gesture image.

According to a third aspect, a system for analyzing a sequence of images for detection of a change in face gesture, comprises: at least one processor executing a code for: analyzing the sequence of time spaced images depicting a face of a subject to compute a baseline representation denoting a baseline state of the subject, for a respective image of the sequence of time spaced images depicting a face of a subject: extracting a plurality of features from the face of the subject of the respective image, computing a respective representation from the plurality of features, comparing the respective representation to the baseline representation, and detecting a change in face gesture of the subject when the comparison is above a threshold.

In a further implementation form of the first, second, and third aspects, the plurality of features are extracted by a biometric system designed to detect an identity of the subject by substantially matching the plurality of features to a plurality of features extracted from a template image of the subject labelled with the identity of the subject.

In a further implementation form of the first, second, and third aspects, the plurality of features extracted by the biometric system are invariant to changes in head pose, lighting, face texture, and motion effects, for detecting the identity of the subject, while depicting changes in facial muscle posture for detecting the change in face gesture.

In a further implementation form of the first and third aspects, the baseline representation and the respective representation each comprise a vector of numerical values, and the comparing is done by computing a distance between the vector of the baseline representation and the vector of the respective representation, and the change in face gesture is detected when the distance is above the threshold.

In a further implementation form of the first and third aspects, analyzing the sequence of time spaced images depicting the face of the subject to compute the baseline representation comprises: clustering the sequence of time spaced images, identifying a cluster of a plurality of similar common images indicating a most common face gesture of the subject, and computing the baseline representation from the identified cluster.

In a further implementation form of the first and third aspects, the clustering is performed using an unsupervised approach using images depicting the subject and excluding images of other subjects.

In a further implementation form of the first and third aspects, identifying the cluster comprises selecting a largest cluster of a plurality of clusters.

In a further implementation form of the first and third aspects, analyzing the sequence of time spaced images depicting the face of the subject to compute the baseline representation comprises: selecting a single image from the sequence of images, extracting the plurality of features from the face of the subject of the single image, and computing the baseline representation from the plurality of features.

In a further implementation form of the first and third aspects, the single image is selected from a start portion of the sequence of images.

In a further implementation form of the first and third aspects, further comprising analyzing the sequence of images to identify a sub-set of common images that are statistically similar to each other, and selecting the single image from the sub-set.

In a further implementation form of the first, second, and third aspects, further comprising: in response to detecting the change in face gesture for the respective image, analyzing the respective image to detect a type of face gesture for the subject.

In a further implementation form of the first, second, and third aspects, analyzing the respective image to detect the type of face gesture comprises feeding to the respective image into a machine learning model trained on a training dataset of a plurality of records, each record depicting a sample image of a sample subject labelled with a ground truth of the type of face gesture.

In a further implementation form of the first and third aspects, further comprising in response to detecting the change in face gesture for the respective image, generating an alert indicating likelihood of the subject being drowsy and/or not paying attention.

In a further implementation form of the first and third aspects, further comprising in response to the alert, generating a visual and/or audio and/or haptic message designed to wake up the subject and/or to focus attention of the subject.

In a further implementation form of the first and third aspects, the sequence of images depict a driver while driving a vehicle.

In a further implementation form of the first and third aspects, further comprising: in response to detecting the change in face gesture depicted a certain image, setting the certain image as a second baseline, and for a new image of a new sequence of time spaced images subsequent to the sequence of time spaced images: extracting the plurality of features from the face of the subject of the new image, computing the respective representation from the plurality of features, comparing the respective representation of the new image to the representation of the new baseline, and detecting the change in face gesture of the subject when the comparison is below a second threshold.

In a further implementation form of the first, second, and third aspects, further comprising feeding the plurality of features extracted from the respective image into a biometric system for confirming that an identity of the subject matches the identity of the subject determined for a baseline image denoting the baseline state using the plurality of features extracted from the baseline image.

In a further implementation of the second aspect, analyzing comprises clustering the sequence of time spaced images, and identifying a cluster of at least one image indicating the face gesture image, wherein the cluster is selected as a second larger or smaller cluster from a plurality of clusters created by the clustering.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
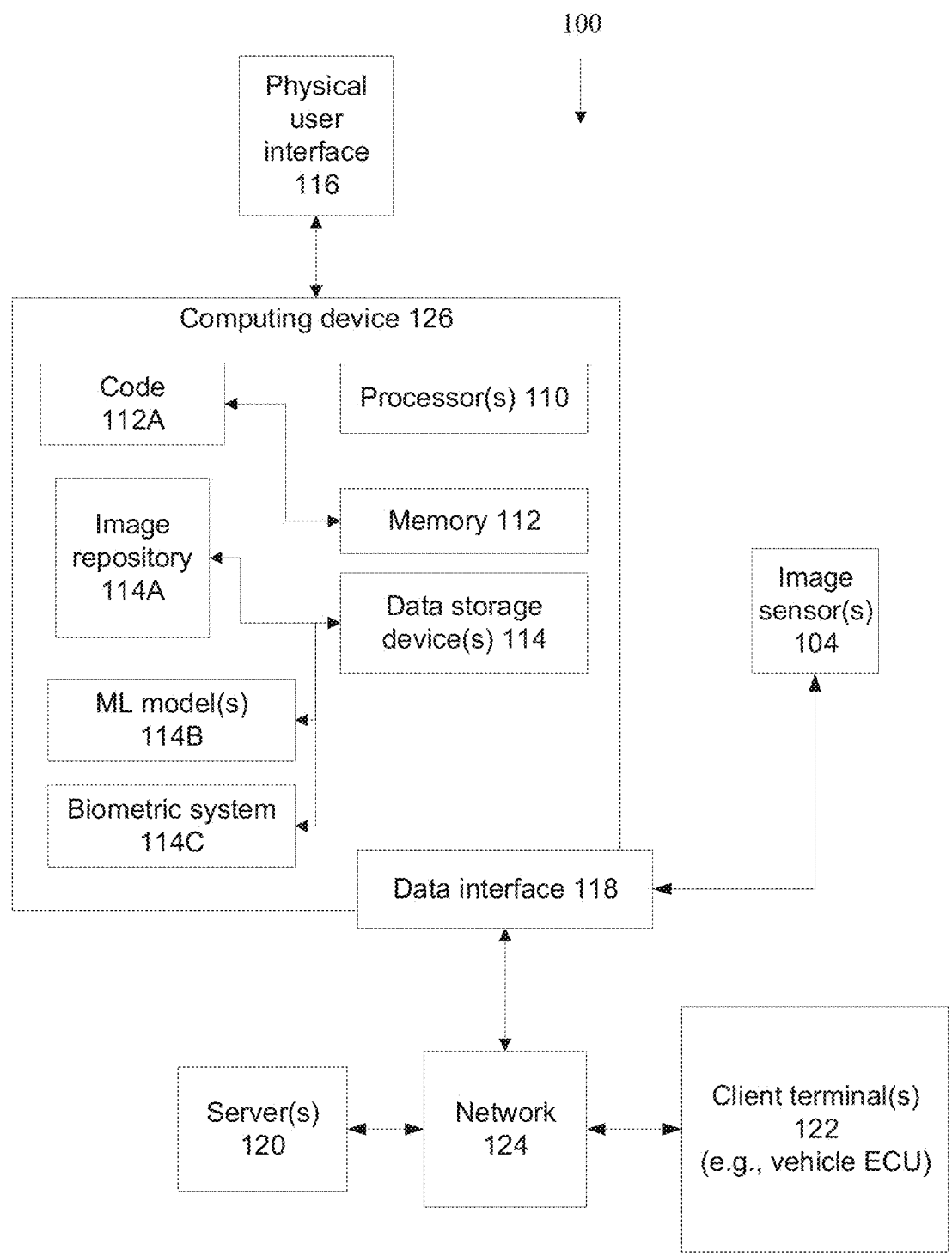
FIG. 1 is a schematic of a block diagram of components of a system for analyzing a sequence of images for detection of a change in face gesture, in accordance with some embodiments of the present invention.

The present invention, in some embodiments thereof, relates to image processing and, more specifically, but not exclusively, to systems and methods for assessing face gesture by analyzing images.

As used herein, the term change in face gesture may refer to a face gesture that is different from a baseline face gesture of a subject, such as a neutral face gesture. The change in face gesture may not necessarily be of a specific face gesture, but rather of any face gesture with reference to the baseline. The change in face gesture may be significant, rather than a minor variation of the baseline. For example, expressing an emotion, drowsiness (e.g., droopy eyes), and the like.

At least some embodiments described herein detect the change in face gesture from the baseline. The specific type of face gesture may then be determined once the change is detected. The change in face gesture may be indicate a face gesture type, for example one or more of: lack of attention, drowsiness, partial eye closure, full eye closure, yawn, feelings such as surprise or boredom, opinions, or an emotion such as anger, or sadness. The change of face gesture may be, for example, positive or negative, as a change from a neutral face gesture. For example, the change in face gesture may occur to a driver of a vehicle, where the driver is initially paying attention to the road, and then becoming drowsy. In another example, the change in face gesture may occur to a student in a class (e.g., virtual, online) where the student loses attention. In yet another example, the change in face gesture may occur to a customer calling customer service, where initially the customer is neutral, and then begins to get angry.

An aspect of some embodiments of the present invention relates to systems, methods, computing devices, and/or code instructions for analyzing a sequence of time spaced images (e.g., video) to detect changes in face gesture of a subject. The sequence of time spaced images, where each image depicts a face of the subject, are analyzed to compute a baseline representation that denotes the baseline state of the subject. For example, the baseline state of the subject indicates a neutral face gesture of the subject, such as the face gesture that appears most commonly in the sequence of images. For a respective image in the sequence (e.g. each image, sampled images, individual images), features are extracted from the subject's face. A respective representation is computed from these features. Subsequently, the respective representation is compared to the baseline representation. A change in face gesture of the subject is determined when the comparison result is above a predetermined threshold, for example, indicating significant difference, such as a distance between the representations (e.g., features), such as a Euclidean distance between vectors created from the features. possible to effectively identify and track Changes in facial gestures throughout the sequence of images may be identified and/or tracked, allowing applications in various fields, for example, facial expression analysis, emotion recognition, and behavior monitoring.

An aspect of some embodiments of the present invention relates to systems, methods, computing devices, and/or code instructions for analyzing a sequence of time spaced images to (e.g., video) to detect one or more individual images depicting a target type of face gesture. The sequence of time spaced images that depict the face of a subject are analyzed to identify a specific face gesture image that indicates a change in the subject's face gesture. The identified image(s) represent the target type of face gesture, for which other image(s) depicting the same or similar target type of face gesture are found. Features are extracted from the subject's face of the identified face gesture image. A face gesture representation is computed based on these features. Features are extracted from the subject's face for individual images (e.g., each image, sampled images) within the sequence of time spaced images. A respective representation is computed using these features. These respective representations are then compared to the previously computed face gesture representation. If the comparison of the respective representation to the face gesture representation falls below a predefined threshold, a change in face gesture is detected. This threshold serves as a measure to determine whether the respective representation does not significantly differs from the image(s) depicting the target type of face gesture, thereby indicating similarity in the subject's face gesture.

At least some implementations of the systems, methods, computing devices, and code instructions described herein address the technical problem of analyzing an image to detect a change in sentiment of a subject. At least some implementations of the systems, methods, computing devices, and code instructions described herein improve the technology of, and/or upon existing technologies of, analyzing images to detect change in face gesture, for example, computer vision and/or machine learning approaches, for example, by providing an alternative approach.

Face gesture (e.g., human sentiment/state) analysis through images of faces is an established field with applications in commerce, alertness monitoring, safety, health, etc. Some of these systems incorporate sentiment analysis, such that they can detect for example if the user (e.g., customer) is angry, violent, happy etc., and adapt further interaction according to it (e.g., transfer the user to a human operator, offer a discount etc.). Typically, sentiment analysis systems track certain visible key-points of the face such as eyes, mouth perimeter and their changes over time. However, keypoint location is also affected by, for example, by lateral face movement, head pose changes, and/or may be sensitive to lighting changes. These factors may affect the accuracy of the face muscle pose estimation.

Analyzing human sentiment from images can be a challenging task due to various factors. For example, human sentiment is highly subjective and can vary across individuals and cultures, making it difficult to create a universally accurate sentiment analysis model. In another example, the emotional state of an individual can be influenced by the context of the image or the events leading up to the photo. Analyzing images in isolation might not capture the full sentiment accurately. In yet another example, some images may be ambiguous, making it challenging to determine the exact emotion accurately. In yet another example, analyzing images that contain people raises privacy and ethical considerations, making it difficult to obtain images to create a training dataset to train an ML model.

At least some implementations of the systems, methods, computing devices, and code instructions described herein address the technical problem of detecting face gesture of a subject with reduced training images and/or without requiring using images with labels created by manual user intervention. At least some implementations of the systems, methods, computing devices, and code instructions described herein improve the technology of image processing, by enabling detection of face gesture of a subject without requiring generation of a labelled training dataset based on user manual intervention, and/or using an unsupervised approach and/or using images of the subject while excluding images of other subject and/or not requiring pre-data such as a training dataset of other subjects. A sequence of images (e.g., video, still photos separated in time by small time intervals) may be analyzed to detect face gesture without requiring labelling of the images with the face gesture, without pre-training a machine learning model, and/or without using images of other subjects.

At least some implementations of the systems, methods, computing devices, and code instructions described herein detect the face gesture in images without requiring that the user generate the face gesture at specific times and/or for specific images based on instructions, and/or where the instructions are used to generate the ground truth label for the image. For example, the user is not asked to make a sad face when a certain image is captured, which may then be used to generate a ground truth label indicating "sad" for tagging the certain image, which may then be used for training. Manual intervention by the user is not necessarily required.

At least some implementations of the systems, methods, computing devices, and code instructions described herein address the technical problem of improving computational efficiency of a computer that analyzes images to detect changes in face gesture. At least some implementations of the systems, methods, computing devices, and code instructions described herein improve computational efficiency of a computer that analyzes images to detect changes in face gesture. Using existing approaches such a machine learning and/or computer vision, analyzing each frame of a sequence of frames, such as a video, is computationally intensive, for example, requiring high utilization of computational resources and/or requiring high memory usages. Moreover existing ML model based approaches require availability of a large training dataset of images of different subjects which may be manually labelled with indications of face gesture. Training the ML model is computationally intensive. The training dataset requires large memory utilization for storage. At least some embodiments described herein improve computational efficiency by providing approaches that do not necessarily use ML models, and/or do not require training datasets, by using non-supervised approaches of images of the subject themselves without images of other subjects.

At least some implementations of the systems, methods, computing devices, and code instructions described herein address the aforementioned technical problems, and/or improve the aforementioned technical field, and/or improve the aforementioned prior approaches, by analyzing a sequence of time spaced images (e.g., video) depicting a face of a subject to compute a baseline representation denoting a baseline state of the subject, for example, a neural face gesture. Images (e.g., each image, sampled images, individual images) of the sequence are analyzed by extracting features from the face of the subject. A respective representation is computed from the features, for example, arranged as a vector. The respective representation to the baseline representation, for example, computing a distance (e.g., Euclidean) between the vectors. A change in face gesture of the subject is detected when the comparison is above a threshold, indicating significant difference between the two representations.

The feature which are extracted from the images may be biometric features extracted by a biometric system that detects an identity of the subject from the image. Biometric systems enable very accurate measurement of key facial features that are not affected by lighting, head pose, face texture etc. At the same time, facial muscle motions that affect areas like the periocular region, nose region, mouth region do have inevitably a small effect on the extracted biometric features. However, even under those motions, a good biometric system will still be able to match the person to the correct biometric template. At least some embodiments described herein compare the biometric features extracted from images, to detect material changes in the facial muscle posture, while being invariant to head pose and motion effects, by leveraging the inherent robustness of biometric features.

At least some implementations of the systems, methods, computing devices, and code instructions described herein address the technical problem of improving accuracy of detecting changes in face gesture. At least some implementations of the systems, methods, computing devices, and code instructions described herein improve the technical field of image processing, by detecting changes in face gesture. At least some implementations of the systems, methods, computing devices, and code instructions described herein address the aforementioned technical problems, and/or improve the aforementioned technical field, by using features extracted by a biometric system used to verify an identity of a subject.

Typically, biometric systems track certain visible facial key-points such as the eyes and mouth perimeter, observing their changes over time. However, the key-point locations can be influenced by factors like lateral face movements, head pose changes, and lighting variations, impacting the accuracy of face muscle pose estimation. Despite this, biometric systems excel at accurately measuring facial features unaffected by lighting, head pose, or face texture. Facial muscle movements in regions like the periocular, nose, and mouth areas may have some effect on the extracted biometric features. Nevertheless, a reliable biometric system can still match a person to the correct biometric template even under these motions. In some embodiments described here, biometric features from each image (e.g., photo/frame) are compared with the baseline representation to detect substantial changes in facial muscle posture, leveraging the inherent robustness of biometric features while remaining invariant to head pose and motion effects.

At least some implementations of the systems, methods, computing devices, and code instructions described herein address the aforementioned technical problems, and/or improve the aforementioned technical field, and/or improve the aforementioned prior approaches, by computing a representation from features extracted from a respective image, which is compared to a baseline representation computed from features extracted from one or more baseline images, for detecting the change in face gesture. Advantages of using the features extracted by the biometric system include improved accuracy in detecting changes in face gesture. These features are designed to be invariant to various changes in the face of the subject and/or the environment, such as head pose, lighting, face texture, and motion effects. Additionally, they offer invariance in detecting the identity of the subject while effectively capturing changes in facial muscle posture for discerning shifts in face gesture. Analyzing these biometric features in relation to a baseline image further enhances face gesture detection, as it helps reduce the occurrence of erroneous results caused by changes in the face and/or environment.

At least some implementations of the systems, methods, computing devices, and code instructions described herein address the aforementioned technical problems, and/or improve the aforementioned technical field, and/or improve the aforementioned prior approaches, by a two-step approach. Initially, the process described herein may act as a pre-filter to select the images where face gesture has changed, in general, without indicating what the face gesture type is. Next, the pre-filtered images may be fed into an ML model (or using other approaches such as computer vision) to determine the face gesture type. This is in contrast, for example, to feeding each image of a greater number of images into the ML model. Analyzing the image(s) for which the change in face gesture has been detected in general, to identify the face gesture type, may improve performance of a computing device performing the analysis. For example, the number of images being fed into a machine learning model trained to detect face gesture type may be reduced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
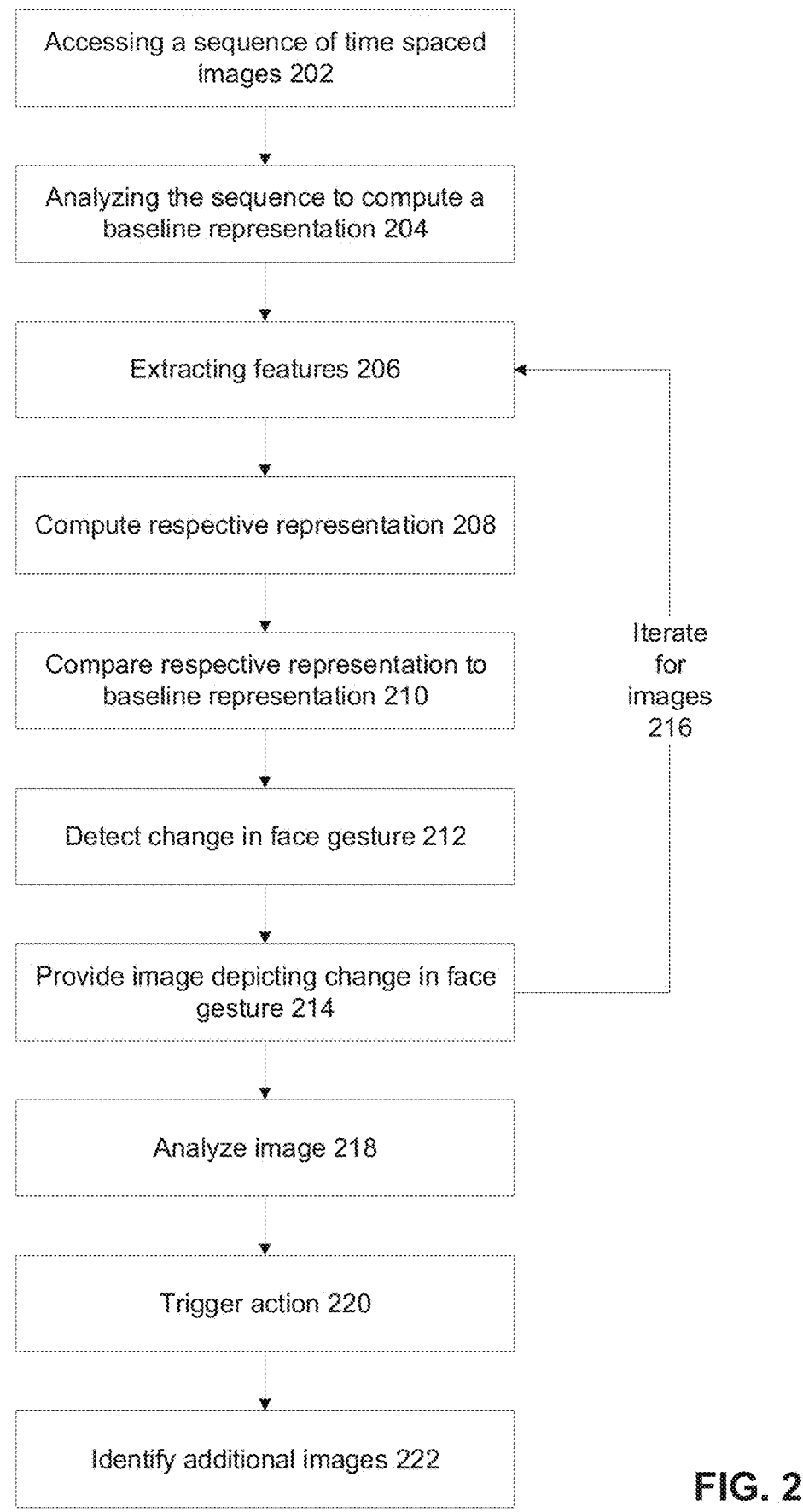
FIG. 2 is a flowchart of a method of analyzing a sequence of images for detection of a change in face gesture, in accordance with some embodiments of the present invention.
Figure 3:
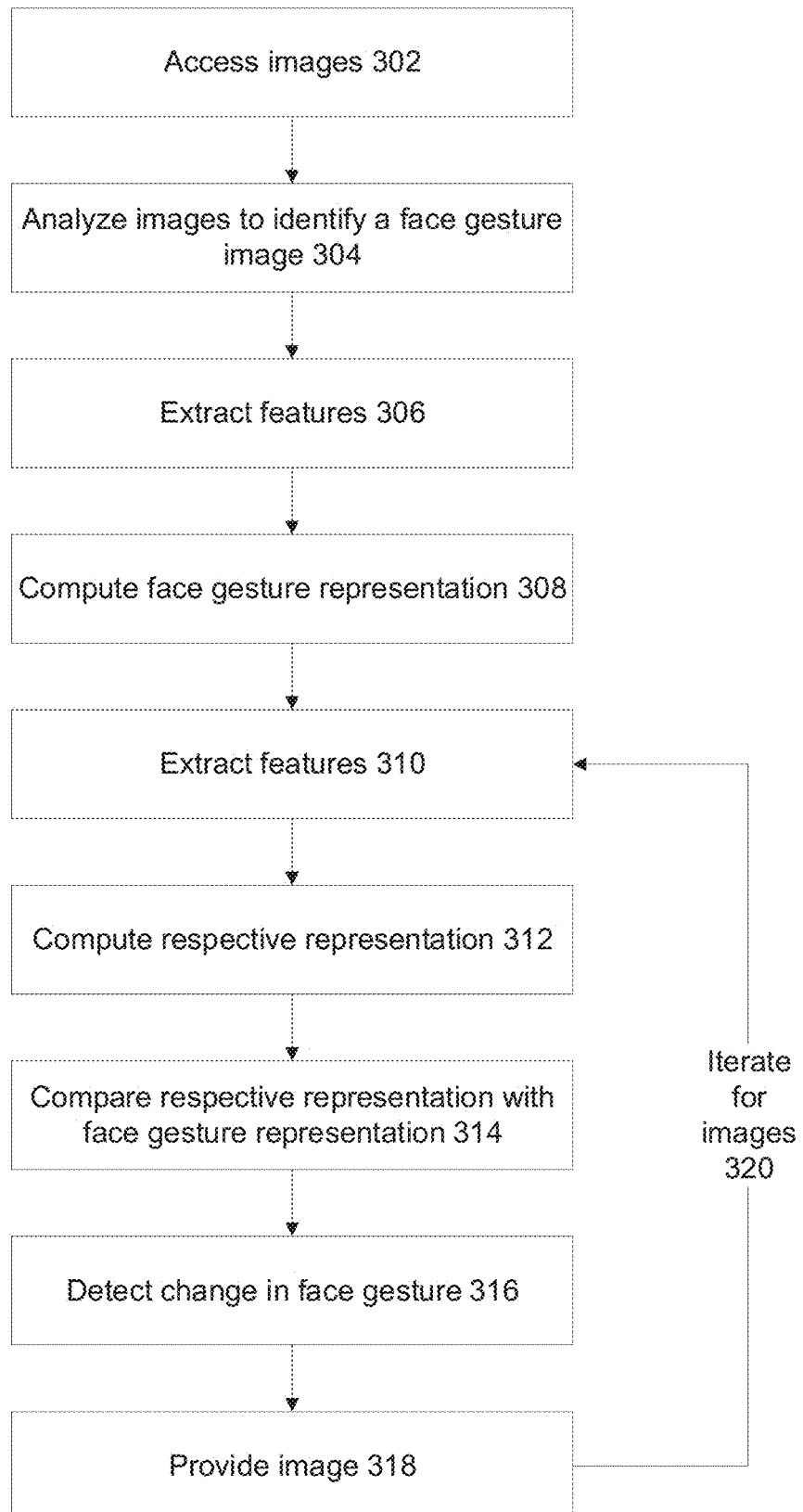
FIG. 3 is a flowchart of another method of analyzing a sequent of images for detection of a change in face gesture, in accordance with some embodiments of the present invention.
Figure 4:
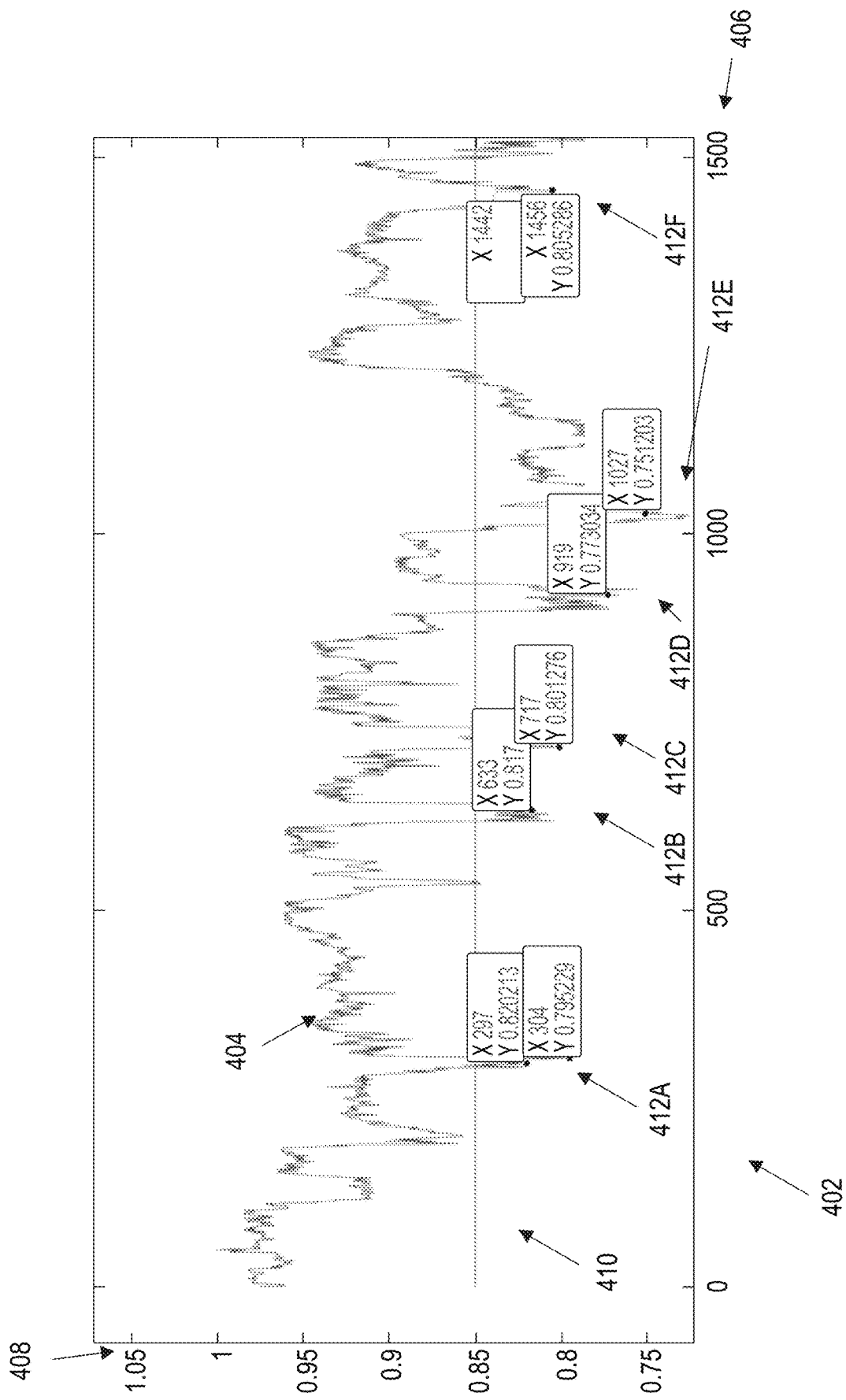
FIG. 4 is a graph of a distance between a vector computed for baseline image and each vector computed for each one of multiple images of a sequence of images of a video depicting a subject, in accordance with some embodiments of the present invention.
Figure 5:
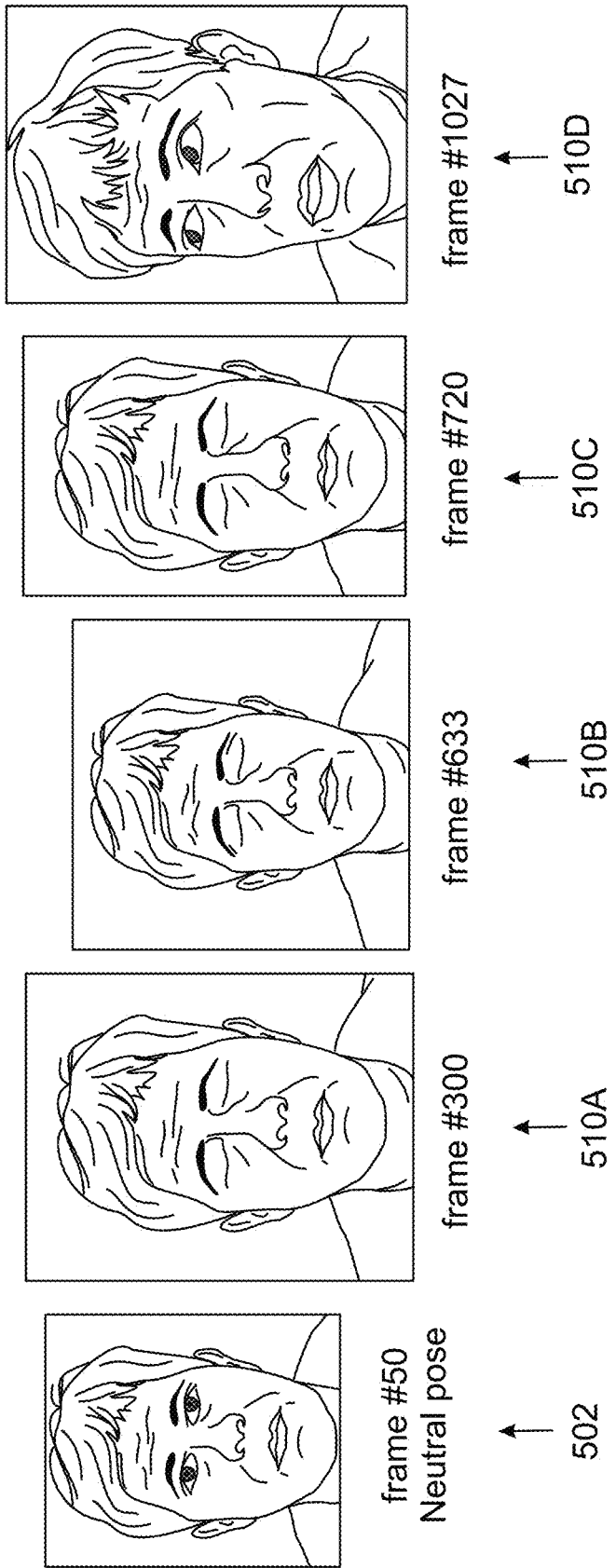
FIG. 5 includes baseline image and images which depict the change in face gesture, corresponding to the images of the graph of FIG. 4, in accordance with some embodiments of the present invention.
Figure 6:
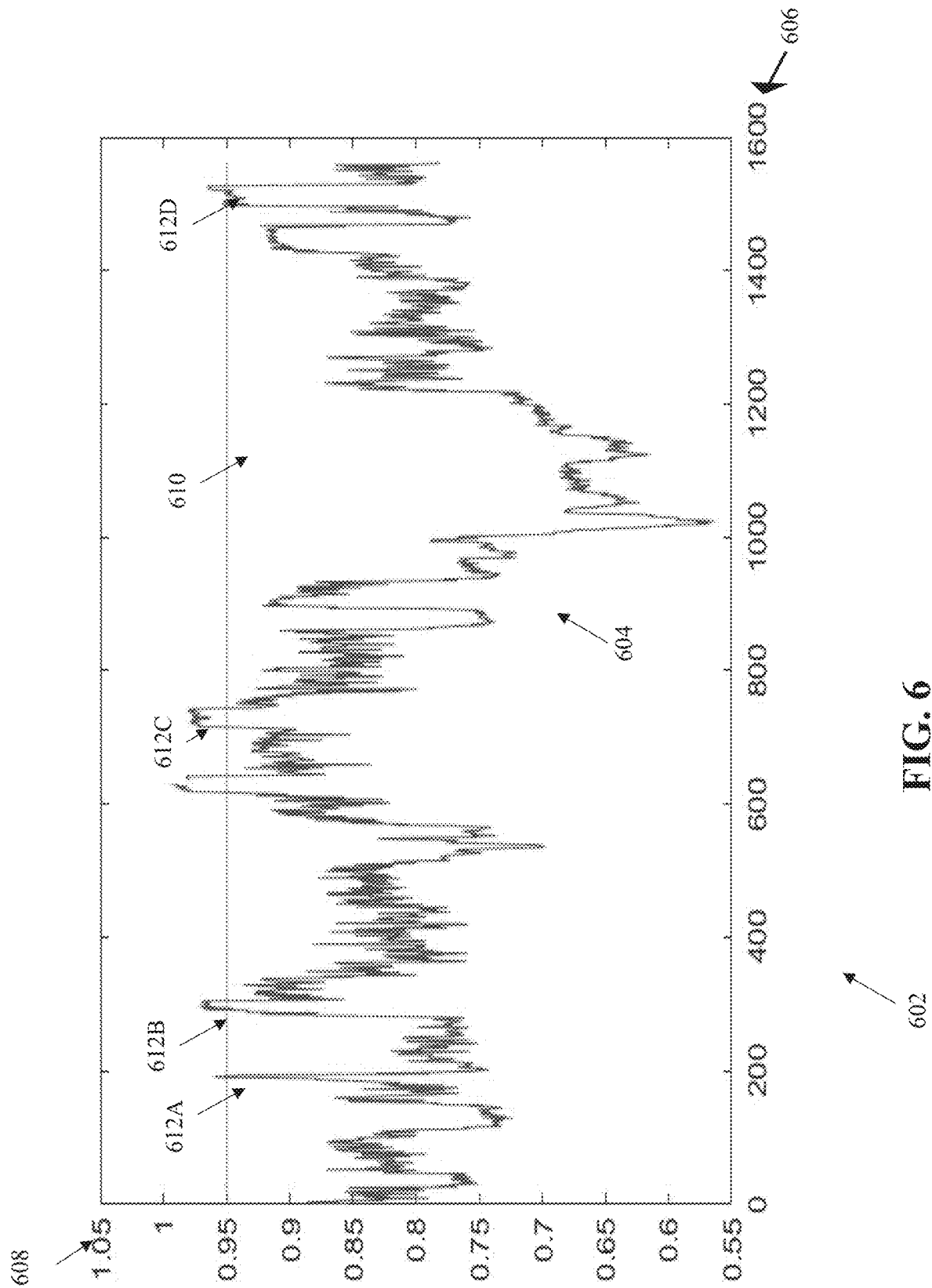
FIG. 6 is a graph of a distance between a vector computed for the new baseline image and each vector computed for each one of multiple images of the sequence of images of the video depicting a subject, in accordance with some embodiments of the present invention.
Figure 7:
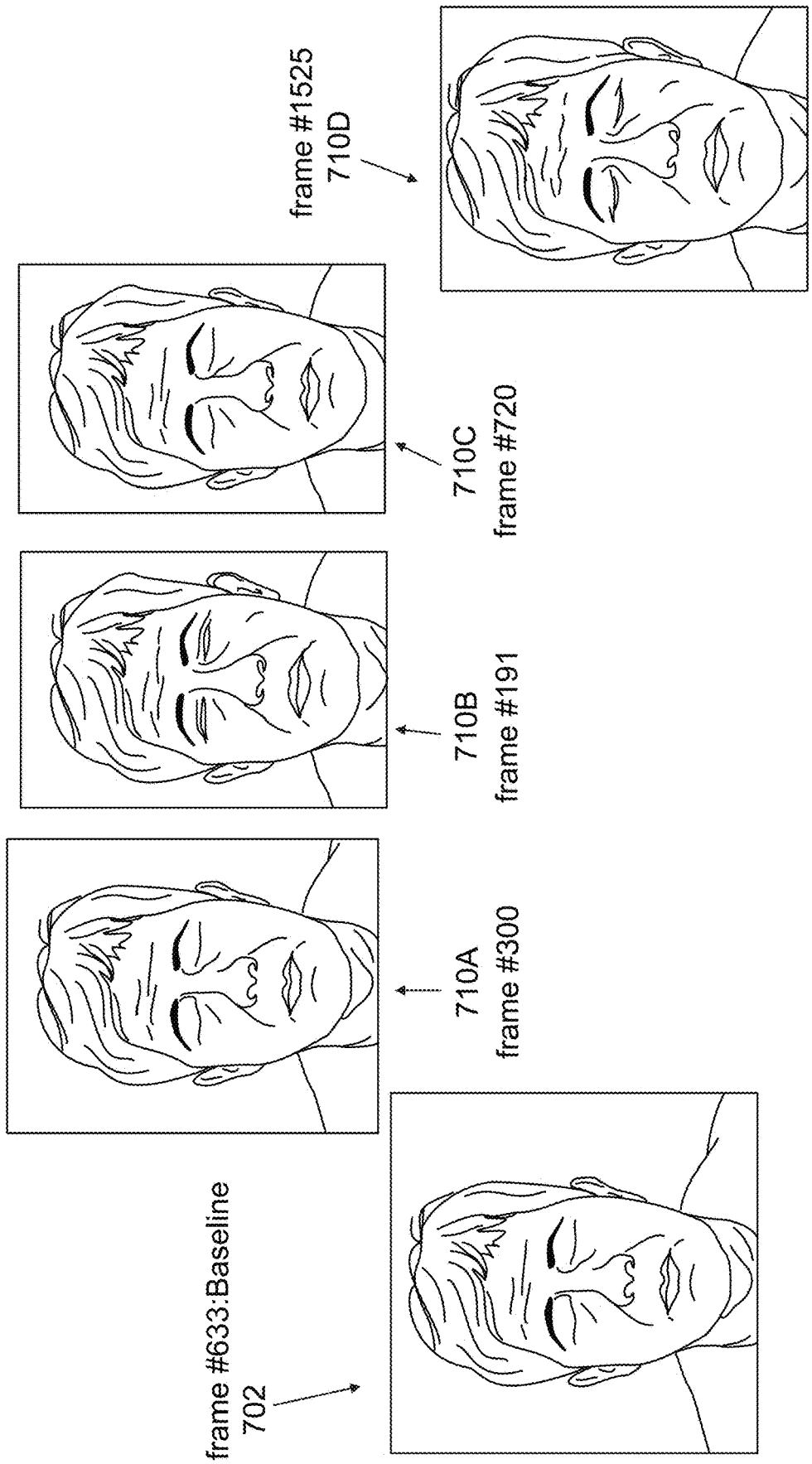
FIG. 7 includes the new baseline image and images which depict a similar change in face gesture, corresponding to the images of the graph of FIG. 6, in accordance with some embodiments of the present invention.

Reference is now made to FIG. 1, which is a schematic of a block diagram of components of a system 100 for analyzing a sequence of images for detection of a change in face gesture, in accordance with some embodiments of the present invention. Reference is also made to FIG. 2, which is a flowchart of a method of analyzing a sequence of images for detection of a change in face gesture, in accordance with some embodiments of the present invention. Reference is also made to FIG. 3, which is a flowchart of another method of analyzing a sequent of images for detection of a change in face gesture, in accordance with some embodiments of the present invention. Reference is also made to FIG. 4, which is a graph 402 of a distance 404 between a vector computed for baseline image and each vector computed for each one of multiple images of a sequence of images of a video depicting a subject, in accordance with some embodiments of the present invention. Reference is also made to FIG. 5, which includes baseline image 502 and images 510A-D which depict the change in face gesture, corresponding to the images of graph 402 of FIG. 4, in accordance with some embodiments of the present invention. Reference is also made to FIG. 6, which is a graph 602 of a distance 604 between a vector computed for the new baseline image and each vector computed for each one of multiple images of the sequence of images of the video depicting a subject, in accordance with some embodiments of the present invention. Reference is also made to FIG. 7, which includes the new baseline image 602 and images 710A-D which depict a similar change in face gesture, corresponding to the images of graph 602 of FIG. 6, in accordance with some embodiments of the present invention.

System 100 may implemented one or more features described with reference to FIGS. 2-7, for example, by processor(s) 110 of a computing device 126 executing code 112A stored on a memory 112.

System 100 includes computing device 126 implemented as, for example one or more and/or combination of: a group of connected devices, a client terminal, a server, a computing cloud, a virtual server, a computing cloud, a virtual machine, a desktop computer, a thin client, a network node, a network server, a vehicle electronic control unit (ECU) and/or a mobile device (e.g., a Smartphone, a Tablet computer, a laptop computer, a wearable computer, glasses computer, and a watch computer).

Different architectures of computing device 126 may be implemented. In an centralized architecture, computing device 126 may provide face gesture detection services to multiple client terminals 122. For example, computing device 126 may be implemented as a server providing remote face gesture detection services to remote client terminals 122, such as for vehicles, and/or remote classrooms. In the centralized architecture, each remote client terminal 122 (e.g., vehicle ECU) may send locally captured images of a respective subject to computing device 126 for centralized detection of face gesture for each subject. Computing device 126 may send the outcome of the analysis to each respective client terminal 122. In another example, computing device 126 may be implemented as a local architecture, for example, part of a local vehicle driver monitoring system, such as installed in vehicles (e.g., planes, busses, trucks, private cards) for monitoring drivers for drowsiness. Computing device 126 may locally analyze images to determine whether a subject's face gesture has changed, for example, when the subject is becoming drowsy and/or losing attention.

Computing device 126 is in communication with one or more image sensors 104, which captures images of the subject. Image sensor(s) 104 may be, for example, a video camera and/or still camera, such as a CCD and/or CMOS sensor. Image sensors 104 are designed to capture a sequence of multiple images of the subject taken at spaced apart time intervals, optionally at a selected frame rate, for example, a video.

Computing device 126 includes a hardware processor(s) 110, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

Computing device 126 includes a memory 112, which stores code 112A for execution by processor(s) 110. Code 112A may include program instructions for implementing one or more features of the method described with reference to FIG. 2 and/or FIG. 3, for analyzing the images to detect face gesture of the subject. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing device 126 may include a data storage device(s) 114, which may store data, for example, image repository 114A that stores the captured images for analysis as described herein, ML model(s) 114B which may analyze images determined as indicting changes in face gesture to determine a specific face gesture, and/or biometric system 114C which may extract the features from the images, as described herein. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

System 100 may include one or more user interfaces 116 that includes a mechanism for user interaction, for example, to enter data and/or to view data (e.g., images identified as depicting the change in face gesture). Exemplary physical user interfaces 116 include, for example, one or more of, a touchscreen, a display, haptic devices, gesture activation devices, a keyboard, a mouse, and voice activated software using speakers and microphone.

System may include one or more data interfaces 118. Data interface(s) 118 provides communication with external devices (e.g., server(s) 120 and/or client terminal(s) 122) optionally over a network 124, for example, for sending a message indicating when a driver of a commercial bus is detected as being drowsy to an administrative server 120 which may alert authorities and/or take other action, and/or receive images from client terminal(s) 122 for centralized analysis.

Data interface 118 may be implemented as, for example, one or more of, a network interface, a USB port, a network interface card, an antenna, a wireless interface to connect to a wireless network, a short range wireless connection, a physical interface for connecting to a cable for network connectivity, a virtual interface implemented in software, network communication software providing higher layers of network connectivity, and/or other implementations.

Network 124 may be implemented as, for example, the internet, a broadcast network, a local area network, a virtual network, a wireless network, a cellular network, a local bus, a point to point link (e.g., wired), and/or combinations of the aforementioned. It is noted at a cable connecting processor(s) 110 and another device may be referred to herein as network 124.

Communication between processor(s) 110 and/or server(s) 120 and/or client terminal(s) 122 over network 124 may be implemented, for example, via an application programming interface (API), software development kit (SDK), functions and/or libraries and/or add-ons added to existing applications executing on server(s) 120 and/or client terminal(s) 122, and/or an application for download and execution on server(s) 120 and/or client terminal(s) 122 that communicates with processor(s) 110, function and/or interface calls to code executed by processor(s) 110.

Referring now back to FIG. 2, at 202, a sequence of time spaced images is accessed. The sequence of images depict a face of a subject. The images are expected to depict the same subject.

The images may be captured while the subject is fairly still. Alternatively or additionally, the images are captured while the subject is engaged in an activity, for example, driving, watching media, talking, walking, standing, and the like. At least some embodiments described herein are able to detect the change in face gesture while the person is engaged in the activity, for example, using the features extracted by the biometric system which are invariant to motion effect due to these activities, for example, as described herein.

The images may be of a person being monitored for changes in face gesture, for example:
  Captured during a video conference call between a client and a customer service representative. The client may be monitored to detect, for example, anger, and/or being upset and/or disappointed. The customer service representative may be monitored to ensure professional courtesy and/or neutral stance, while avoiding anger and/or feeling of annoyance.
  The images may be of a driver of a vehicle, which may be a private vehicle or public vehicle, with passengers or without, for example, a car, plane, bus, truck, and crane.

The driver may be monitored, for example, for detecting drowsiness and/or lack of attention being paid to the road.

The images may be of a student(s) attending a class, which may be frontal or virtual. The students may be monitored to detect, for example, lack of attention and/or drowsiness.

The images may be of a patient, which may be monitored to detect, for example, pain, sadness, and the like, which may trigger a suitable response by the healthcare team.

The images may be, for example, a video of frames, spaced apart by a selected frame rate. In another example, the images may be a sequence of still images which may be spaced apart at regular intervals, and/or irregular intervals such as triggered by detected changes between images.

At 204, the sequence of time spaced images are analyzed for computing and/or identifying a baseline representation denoting a baseline state of the subject. The baseline representation may be computed from one or more baseline images which may be identified by analyzing the sequence of images.

The baseline state of the subject may refer to the neutral, or most common, or initial state of the subject. For example, the face gesture expressed by a face of a caller initially calling customer service, the face gesture expressed by a face of a driver while driving the vehicle, the face gesture expressed by a face of a student paying attention in class, and the face gesture expressed by a face of a patient that is currently comfortable.

The baseline state of the subject may refer to the face gesture expressed by the face of the subject, for example, a neutral state indicating a neutral face gesture, the state of the subject during a start of the sequence of images representing the initial face gesture of the subject, and/or the state of the subject depicted in a majority of the images.

The baseline state of the subject may be determined without requiring that the user generate the face gesture at specific times and/or for specific images based on instructions (e.g., using an unsupervised approach). The requirement to provide ground truth labels, which can be technically challenging, may be eliminated. The baseline state of the subject may be determined without using a machine learning model, which improves efficiency of computational resources of a computing device that determines the baseline state. The baseline state may be determined without requiring a large training dataset and/or without using images of other subjects, which improves efficiency of computational resources and/or memory resources of a computing device that determines the baseline state. Privacy issues related to obtaining and using images of other subjects are moot.

Different exemplary approaches are now described for computing the baseline representation.

In an approach, the sequence of time spaced images may be clustered, for example, using an unsupervised approach. The clustering may be performed using images depicting the subject and excluding images of other subjects. A cluster of similar common images indicating a most common face gesture of the subject may be selected. The largest cluster may be selected based on the assumption that the baseline state is expressed in the majority of images. The baseline representation may be computed from the identified cluster. The baseline representation may be computed from multiple baseline images of the cluster, optionally all of the images, or a selected subset of images, for example, images at different locations within the cluster. Alternatively, the baseline representation may be computed from a single baseline image selected from the cluster, for example, randomly selected and/or image closest to the centroid.

In another approach, one or more baseline images may be selected from an initial set of images of the sequence, for example, the first 3 seconds, or first 10 seconds, or first 100 images, or first 500 images, and the like. The baseline image(s) may be selected from the initial set of images based on the assumption that the subject is depicts the baseline state at the beginning of being recorded, i.e., prior to expressing emotions and/or losing attention.

In another approach, a subset of common images that are statistically similar to one another is identified from the sequence of images. The common images may be selected based on the assumption that the baseline state is the state that the user is usually in, as depicted in most images. The user sometimes changes face gesture from the baseline state. The common images may be found, for example, by using computer vision approaches, machine learning approaches, computing optical flow between images, and/or correlating images to find the set of images that are most similar. One or more baseline images may be selected from the subset to determine the baseline state.

The baseline representation may be created, by extracting features from the baseline image(s) as described with reference to 206, and computing the baseline representation using the features as described with reference to 208.

Features described with reference to 206-214 are now described for a respective individual image which is being evaluated to detect the change in face gesture. For example, each image of the sequence is evaluated, or a subset of the sequence images are evaluated, for example, by sampling the sequence, such as every second image, or every $10^{th}$ image, and the like.

At 206, features are extracted from the face of the subject depicted in the respective image.

Optionally, the features are extracted by a biometric system designed to detect an identity of the subject. The biometric system may detect the identity of the subject, for example, by matching the extracted features to features extracted from a template image of the subject labelled with the identity of the subject.

Using the features extracted by the biometric system may improve the accuracy of detecting changes in face gesture. The biometric system may extract visible key-point features of the face, such as eyes, mouth perimeter, and their changes over time. The features extracted by the biometric system may be invariant to changes in the face of the subject and/or the environment, for example, head pose, lighting, face texture, and motion effects. The features may be invariant to changes in detecting the identity of the subject while depicting changes in facial muscle posture for detecting the change in face gesture. By analyzing the features extracted by the biometric system for the respective image relative to the baseline, which is invariant to changes in the face and/or environment, the change in face gesture may be detected, while reducing erroneous results that might otherwise be generated due to the impact of changes in the face and/or environment.

Alternatively or additionally, other features (e.g., key-point features) are extracted, for example, Scale-Invariant Feature Transform (SIFT), Histogram of Oriented Gradients (HOG), and embedding from one or more hidden layers of a neural network which may be trained on a training dataset of, for example, images labelled with a ground truth indication of face gesture.

In the case of multiple images (e.g., multiple baseline images), features may be extracted from multiple image. The features may be aggregated (e.g., averaged) to obtain a single set of features.

At 208, a respective representation is computed from the extracted features, for example, a vector, The extracted features may be transformed into a numerical representation, which may be arranged as the vector. The vector may be formed, for example, by concatenating and/or combining the extracted features into a single long vector. The length of the vector may be determined by the number of features extracted. In some cases, the vector representing the extracted features can be very high-dimensional, making it computationally expensive or prone to overfitting in machine learning tasks. Dimensionality reduction techniques like Principal Component Analysis (PCA) or t-distributed Stochastic Neighbor Embedding (t-SNE) can be applied to reduce the dimensionality while preserving important information.

At 210, the respective representation is compared to the baseline representation.

Optionally, the comparison is done by computing a distance between the respective representation and the baseline representation. The distance may be computed between the vector of the respective representation and the vector of the baseline representation. Examples of approaches for computing distance include Euclidean distance, and cosine similarity.

At 212, the change in face gesture of the subject may be determined when the comparison is above a threshold. For example, when the distance between the vector of the respective representation and the vector of the baseline representation is greater than the threshold.

At 214, the respective image for which the change in face gesture is determined may be provided, for example, stored on a memory, fed into another executing process (e.g., as described herein), forwarded to a remote device, and presented on a display.

At 216, one or more features described with reference to 206-214 may be iterated, for example, for each respective image of the sequence of time spaced images depicting the face of a subject. Alternatively, the iterations may be for a subset of the images of the sequence, such as every $3^{rd}$, $10^{th}$, or other sampling period. The sampling of the images may be, for example, when the sequence is captured at a high frame rate where non-significant changes occur between neighboring images.

When there is a short sequence of frames, all of which are determined to depict the change in face gesture, the frame with minimum local distance may be selected as the representative of the short sequence. For example, the subject may appear drowsy over a second or two, which may correspond to 50-100 frames. The frame with minimal distance may be selected from the 50-100 as best representing the drowsiness.

At 218, the respective image(s) for which the change in face gesture has been detected, may be analyzed.

The analysis may be performed to detect the subject's face gesture type. The change in face gesture may be generic, indicating that the face gesture of the subject has changed relative to the baseline, without indicating which the face gesture type is. The analysis may indicate the face gesture type, for example, The respective image(s) for which the change in face gesture has been detected, may be fed into a machine learning model to obtain the face gesture type as an outcome. The machine learning model may be trained on a training dataset of records, where each record includes a sample image of a sample subject labelled with a ground truth of the type of face gesture. The machine learning model may be implemented as, for example, a neural network or other suitable image processing approach. Other approaches may be used to determine the face gesture type, for example, computer vision, and the like.

Alternatively or additionally, the respective image(s) may be analyzed by feeding the features extracted from the respective image into the biometric system. The identity of the subject in the respective image(s) may be confirmed as matching the identity of the subject determined for the baseline state using features extracted from the baseline line. Verification of the identity may be performed, for example, to reduce errors occurring where subjects were switched, for example, a different driver.

At 220, one or more actions may be triggered in response to detecting the change in face gesture for the respective image. Alternatively or additionally, the action(s) may be triggered in response to detecting the change in the type of face gesture.

Optionally, the action may be an alert, for example, presented on a display, played on audio speakers, and/or forward to a remote device such as a server. For example, in response to detecting a change in face gesture of a bus or truck driver, which may indicate that the driver is drowsy and/not paying attention, an alert to a monitoring server may be sent.

Alternatively or additionally, the action may be generating a visual and/or audio and/or haptic message, optionally according to the face gesture type and/or for the face gesture change. For example, in response to detecting a change in face gesture of a bus or truck driver, which may indicate that the driver is drowsy and/not paying attention, a visual and/or audio and/or haptic message designed to wake up the subject and/or to focus attention of the subject may be generated. For example, instructions may be generated for: vibrating the seat, lowering the temperature of the air conditioner, playing loud music, and the like.

Alternatively or additionally, the action may be establishing a communication session with a remote location, for example, to speak with a supervisor.

For example, in response to detecting a change in face gesture of a bus or truck driver, which may indicate that the driver is drowsy and/not paying attention, a communication channel may be opened between a supervisor and the driver, for example, to see if the driver needs a rest and/or needs to be replaced.

At 222, in response to detecting one or more respective images depicting the change in face gesture, other images that correlate with the respective images may be searched for. The result of the search may be other images that depict the change in face gesture. The other images that are searched may include the other images of the sequence, and/or newly captured sequence of images.

The search may done, for example, as described with reference to FIG. 3.

Referring now back to FIG. 3, the process described with reference to FIG. 3 first identifies a face gesture image for which the change in face gesture has been determined. Then, images are analyzed to find images that are similar to the face gesture image, indicating that those images also indicate the change in face gesture.

At 302, images to be analyzed are accessed. The images may be a new sequence of time spaced images subsequent to the sequence of time spaced images described with reference to FIG. 2. The images may be other images of the sequence of time spaced images described with reference to FIG. 2.

The images depict a face of a subject.

At 304, a face gesture image is identified. The face gesture image may be referred to as a second baseline image, in contrast to the baseline image described with reference to FIG. 2.

The face gesture image is an image of the sequence for which the change in face gesture is detected.

The face gesture image may be one or more of the respective images for which the change in face gesture has been detected, as described with reference to FIG. 2.

The face gesture image may be found by clustering the sequence of time spaced images, for example, using an unsupervised approach. A cluster of one or more images may be selected. The cluster that is second largest or smaller may be selected. The largest cluster may include images which represent the baseline, such as a neutral state without face gesture, as described with reference to FIG. 2. One or more images may be selected from the selected cluster as the sentinel image(s), for example, image(s) closest to the centroid, randomly selected from the images of the cluster, and/or a sample of images distributed within the cluster.

At 306, features are extracted from the face of the subject of the face gesture image, for example, as described with reference to 206 of FIG. 2.

At 308, a face gesture representation is computed from the features, for example, as described with reference to 208 of FIG. 2.

Features described with reference to 310-318 are now described for a respective individual image which is being evaluated to detect the change in face gesture. For example, each image of the sequence is evaluated, or a subset of the sequence images are evaluated, for example, by sampling the sequence, such as every second image, or every $10^{th}$ image, and the like.

At 310, features are extracted from the face of the subject of the respective image, for example, as described with reference to 206 of FIG. 2.

At 312, a respective representation is computed from the features, for example, as described with reference to 206 of FIG. 2.

At 314, the respective representation is compared to the face gesture representation, for example, by computing the distance between a vector of the respective representation and a vector of the face gesture representation, as described with reference to 206 of FIG. 2.

At 316, the change in face gesture may be determined when the comparison is below a threshold. For example, when the distance is below the threshold, which indicates that the respective image is similar to the face gesture image.

At 318, in response to determining that the respective image depicts the change in face gesture, the respective image may be provided, for example, as described with reference to 214 of FIG. 2.

The image may be analyzed, for example, as described with reference to 218 of FIG. 2.

An action may be triggered, for example, as described with reference to 220 of FIG. 2.

At 320, features described with reference to 310 to 318 may be iterated, for images of the sequence.

Reference is now made to FIG. 4, which is a graph 402 of a distance 404 between a vector computed for baseline image and each vector computed for each one of multiple images of a sequence of images of a video depicting a subject, in accordance with some embodiments of the present invention. The x-axis 406 denotes the frame number of the images. The y-axis 408 denotes a value of distance 404.

Distance 404 is the cosine distance. The vectors are unit normalized vectors.

The baseline image has been determined to be frame #50, depicting a neutral pose. Frames with distances less than a threshold 410 depict a change in face gesture relative to the baseline frame. Local minimums may be selected to obtain the frame(s) most likely depicting the change in face gesture. For example, points 412A-F are selected.

Referring now back to FIG. 5, baseline image 502 and images 510A-D which depict the change in face gesture, corresponding to the images of graph 402 of FIG. 4, are presented. Baseline image 502 is frame #50. Images 510A-D are frames #300, #633, #720, and #1027 of the video, found by identifying low cosine distances between their respective vectors and the vector of frame #50, corresponding to graph 402 of FIG. 4.

Frame #633 was then selected as the new baseline, for example, indicating the specific face gesture type of drowsiness.

Referring now back to FIG. 6, which is a graph 602 of a distance 604 between a vector computed for the new baseline image and each vector computed for each one of multiple images of the sequence of images of the video depicting a subject, are presented. The x-axis 606 denotes the frame number of the images. The y-axis 608 denotes a value of distance 604.

Frames with distances greater than a threshold 610 indicates frames which are similar to the new baseline image in terms of depicting a face gesture of a similar type, i.e. also drowsiness. Local maximums may be selected to obtain the frame(s) most likely depicting a similar change in face gesture as depicted in the new baseline image. For example, points 612A-D are selected.

Referring now back to FIG. 7, which includes the new baseline image 702 and images 710A-D which depict a similar change in face gesture, corresponding to the images of graph 602 of FIG. 6, are presented. The new baseline image denoting drowsiness 602 is frame #633. Images 710A-D are frames #300, #191, #720, and #1525 of the video, found by identifying high cosine distances between their respective vectors and the vector of frame #633, corresponding to graph 602 of FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant features will be developed and the scope of the term feature is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of analyzing a sequence of images for detection of a change in face gesture, comprising:
    analyzing the sequence of time spaced images depicting a face of a subject to compute a baseline representation denoting a baseline state of the subject;
    for a respective image of the sequence of time spaced images depicting a face of a subject:
        extracting a plurality of features from the face of the subject of the respective image;
        computing a respective representation from the plurality of features;
        comparing the respective representation to the baseline representation; and
    detecting a change in face gesture of the subject when the comparison is above a threshold;
    wherein the plurality of features are extracted by a biometric system designed to detect an identity of the subject by substantially matching the plurality of features to a plurality of features extracted from a template image of the subject labelled with the identity of the subject
    wherein the plurality of features extracted by the biometric system are invariant to changes in head pose, lighting, face texture, and motion effects, for detecting the identity of the subject, while depicting changes in facial muscle posture for detecting the change in face gesture.

2. The computer implemented method of claim 1, wherein the baseline representation and the respective representation each comprise a vector of numerical values, and the comparing is done by computing a distance between the vector of the baseline representation and the vector of the respective representation, and the change in face gesture is detected when the distance is above the threshold.

3. The computer implemented method of claim 1, wherein analyzing the sequence of time spaced images depicting the face of the subject to compute the baseline representation comprises:
    clustering the sequence of time spaced images;
    identifying a cluster of a plurality of similar common images indicating a most common face gesture of the subject; and
    computing the baseline representation from the identified cluster.

4. The computer implemented method of claim 3, wherein the clustering is performed using an unsupervised approach using images depicting the subject and excluding images of other subjects.

5. The computer implemented method of claim 1, wherein analyzing the sequence of time spaced images depicting the face of the subject to compute the baseline representation comprises:
    selecting a single image from the sequence of images;
    extracting the plurality of features from the face of the subject of the single image; and
    computing the baseline representation from the plurality of features.

6. The computer implemented method of claim 5, wherein the single image is selected from a start portion of the sequence of images.

7. The computer implemented method of claim 5, further comprising analyzing the sequence of images to identify a sub-set of common images that are statistically similar to each other, and selecting the single image from the sub-set.

8. The computer implemented method of claim 1, further comprising:
in response to detecting the change in face gesture for the respective image, analyzing the respective image to detect a type of face gesture for the subject.

9. The computer implemented method of claim 8, wherein analyzing the respective image to detect the type of face gesture comprises feeding to the respective image into a machine learning model trained on a training dataset of a plurality of records, each record depicting a sample image of a sample subject labelled with a ground truth of the type of face gesture.

10. The computer implemented method of claim 1, further comprising in response to detecting the change in face gesture for the respective image, generating an alert indicating likelihood of the subject being drowsy and/or not paying attention.

11. The computer implemented method of claim 10, further comprising in response to the alert, generating a visual and/or audio and/or haptic message designed to wake up the subject and/or to focus attention of the subject.

12. The computer implemented method of claim 10, wherein the sequence of images depict a driver while driving a vehicle.

13. A computer implemented method of analyzing a sequence of images for detection of a change in face gesture, comprising:
analyzing the sequence of time spaced images depicting a face of a subject to compute a baseline representation denoting a baseline state of the subject;
for a respective image of the sequence of time spaced images depicting a face of a subject:
extracting a plurality of features from the face of the subject of the respective image;
computing a respective representation from the plurality of features;
comparing the respective representation to the baseline representation; and
detecting a change in face gesture of the subject when the comparison is above a threshold;
wherein analyzing the sequence of time spaced images depicting the face of the subject to compute the baseline representation comprises:
clustering the sequence of time spaced images;
identifying a cluster of a plurality of similar common images indicating a most common face gesture of the subject; and
computing the baseline representation from the identified cluster;
wherein the clustering is performed using an unsupervised approach using images depicting the subject and excluding images of other subjects,
wherein identifying the cluster comprises selecting a largest cluster of a plurality of clusters.

14. The computer implemented method of claim 13, wherein the plurality of features are extracted by a biometric system designed to detect an identity of the subject by substantially matching the plurality of features to a plurality of features extracted from a template image of the subject labelled with the identity of the subject.

15. A computer implemented method of analyzing a sequence of images for detection of a change in face gesture, comprising:
analyzing the sequence of time spaced images depicting a face of a subject to compute a baseline representation denoting a baseline state of the subject;
for a respective image of the sequence of time spaced images depicting a face of a subject:
extracting a plurality of features from the face of the subject of the respective image;
computing a respective representation from the plurality of features;
comparing the respective representation to the baseline representation; and
detecting a change in face gesture of the subject when the comparison is above a threshold;
in response to detecting the change in face gesture depicted a certain image, setting the certain image as a second baseline; and
for a new image of a new sequence of time spaced images subsequent to the sequence of time spaced images:
extracting the plurality of features from the face of the subject of the new image;
computing the respective representation from the plurality of features;
comparing the respective representation of the new image to the representation of the new baseline; and
detecting the change in face gesture of the subject when the comparison is below a second threshold.

16. The computer implemented method of claim 15, further comprising feeding the plurality of features extracted from the respective image into a biometric system for confirming that an identity of the subject matches the identity of the subject determined for a baseline image denoting the baseline state using the plurality of features extracted from the baseline image.

17. A computer implemented method of analyzing a sequence of images for detection of a change in face gesture, comprising:
analyzing the sequence of time spaced images depicting a face of a subject to identify a face gesture image indicating a change in face gesture of the subject;
extracting a plurality of features from the face of the subject of the face gesture image;
computing a face gesture representation from the plurality of features;
for a respective image of the sequence of time spaced images:
extracting the plurality of features from the face of the subject of the respective image;
computing a respective representation from the plurality of features;
comparing the respective representation to the face gesture representation; and
detecting the change in face gesture when the comparison is below a threshold indicating similarity with the face gesture image, wherein analyzing comprises
clustering the sequence of time spaced images; and
identifying a cluster of at least one image indicating the face gesture image, wherein the cluster is selected as a second larger or smaller cluster from a plurality of clusters created by the clustering.

18. A system for analyzing a sequence of images for detection of a change in face gesture, comprising:

at least one processor executing a code for:
analyzing the sequence of time spaced images depicting a face of a subject to compute a baseline representation denoting a baseline state of the subject;
  for a respective image of the sequence of time spaced images depicting a face of a subject:
  extracting a plurality of features from the face of the subject of the respective image;
  computing a respective representation from the plurality of features;
  comparing the respective representation to the baseline representation; and
detecting a change in face gesture of the subject when the comparison is above a threshold;
wherein the plurality of features are extracted by a biometric system designed to detect an identity of the subject by substantially matching the plurality of features to a plurality of features extracted from a template image of the subject labelled with the identity of the subject
wherein the plurality of features extracted by the biometric system are invariant to changes in head pose, lighting, face texture, and motion effects, for detecting the identity of the subject, while depicting changes in facial muscle posture for detecting the change in face gesture.

* * * * *